United States Patent
Ferrand (10) Patent No.: US 11,205,377 B2
(45) Date of Patent: Dec. 21, 2021

(54) METHOD OF MONITORING A TASK FOR AN ELECTRONIC MODULE

(71) Applicant: STMicroelectronics (Rousset) SAS, Rousset (FR)

(72) Inventor: Olivier Ferrand, Carry le Rouet (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 16/669,968

(22) Filed: Oct. 31, 2019

(65) Prior Publication Data

US 2020/0143738 A1     May 7, 2020

(30) Foreign Application Priority Data

Nov. 6, 2018 (FR) ...................................... 1860187

(51) Int. Cl.
  *G09G 3/3225* (2016.01)

(52) U.S. Cl.
  CPC ..... *G09G 3/3225* (2013.01); *G09G 2320/048* (2013.01); *G09G 2320/103* (2013.01)

(58) Field of Classification Search
  CPC ............. G06F 11/3612; G06F 11/0715; G06F 11/0757; G06F 11/3419; G06F 11/076; G06F 11/3423; G06F 2201/81; G06F 2201/88; G06F 11/00; G06F 11/008; G06F 11/0745; G06F 11/327; G09G 3/3225
  See application file for complete search history.

(56) References Cited

U.S. PATENT DOCUMENTS

| | | | | |
|---|---|---|---|---|
| 4,635,258 A | * | 1/1987 | Salowe | ............... G06F 11/1441 714/16 |
| 5,990,858 A | | 11/1999 | Ozolins | |
| 6,369,856 B1 | | 4/2002 | Jeong | |
| 7,124,332 B2 | * | 10/2006 | Constantinescu | ..... G06F 11/008 714/52 |
| 8,560,753 B1 | | 10/2013 | Hobbs et al. | |
| 9,298,556 B2 | * | 3/2016 | Mueller | ............. G06F 11/0724 |
| 9,766,997 B2 | * | 9/2017 | Brandt | ............... G06F 11/3466 |
| 10,123,385 B1 | | 11/2018 | Chang | |
| 10,592,322 B1 | * | 3/2020 | Seshadri | ............. G06F 11/3485 |
| 2001/0050724 A1 | | 12/2001 | Kim | |
| 2004/0234121 A1 | | 11/2004 | Fujii et al. | |

(Continued)

FOREIGN PATENT DOCUMENTS

CN    101592976 A    12/2009
JP    2002229544 A    8/2002

(Continued)

OTHER PUBLICATIONS

Liu, Changdong, et al., "Multipoint Multimedia Teleconference System with Adaptive Synchronization", IEEE Journal on Selected Areas in Communications, vol. 14, No. 7, Sep. 1996, 14 pages.

*Primary Examiner* — Sardis F Azongha
(74) *Attorney, Agent, or Firm* — Slater Matsil, LLP (57) ABSTRACT

A method can be used monitoring a task for an electronic module. The method includes waiting for performance of the task, timing the wait, the timing being regulated by a clock signal and generating an alert signal when the timing of the wait has exceeded a reference value. The device can be part of a multimedia interface (e.g., a display) electronic module and the task a graphical task (e.g., an image refresh).

20 Claims, 5 Drawing Sheets

(56) References Cited

U.S. PATENT DOCUMENTS

| | | | |
|---|---|---|---|
| 2006/0036893 A1* | 2/2006 | Anglin | H04L 43/18 |
| | | | 714/4.2 |
| 2007/0013811 A1 | 1/2007 | Hsieh et al. | |
| 2007/0266345 A1 | 11/2007 | Cok | |
| 2012/0159259 A1 | 6/2012 | Klein et al. | |
| 2015/0058827 A1* | 2/2015 | Hanssen | G06F 11/3648 |
| | | | 717/129 |

FOREIGN PATENT DOCUMENTS

| | | |
|---|---|---|
| JP | 2004266745 A | 9/2004 |
| JP | 2018045283 A | 3/2018 |
| KR | 20080067194 A | 7/2008 |
| KR | 20130066202 A | 6/2013 |
| TW | I620465 B | 4/2018 |
| WO | 2015058718 A1 | 4/2015 |

\* cited by examiner

METHOD OF MONITORING A TASK FOR AN ELECTRONIC MODULE

CROSS-REFERENCE TO RELATED APPLICATIONS

This application claims priority to French Patent Application No. 1860187, filed on Nov. 6, 2018, which application is hereby incorporated herein by reference.

TECHNICAL FIELD

Modes of implementation and embodiments relate to a method monitoring a task for an electronic module.

BACKGROUND

Devices for monitoring a task for an electronic module are commonly referred to by the person skilled in the art by the expression "Watchdog."

Electronic modules of the multimedia interface type, in particular OLED ("Organic Light-Emitting Diode") displays, or else active matrix OLED displays, usually referred to by the acronym AMOLED standing for "Active Matrix OLED," are advantageous in numerous regards and are increasingly being used in all forms of application.

A drawback, which is almost exclusive, of this type of display is its lifetime. Indeed, OLED displays deteriorate when they display a static signal for too long, in particular, a white light static signal.

Of course, other types of electronic modules may also deteriorate in case of absence of performing of a task, for example, in the case of an electronic module controlled by an ancillary element which might not be perfectly adapted or configured for this electronic module. Indeed, it may be tricky for a non-expert user to alleviate by anticipation any risky situation in the use of the electronic module.

SUMMARY

Modes of implementation and embodiments relate to the monitoring of a task for an electronic module. Particular embodiments relate to a graphical task for a multimedia interface module of the OLED display type.

Embodiments can protect electronic modules in their usage, for example, with regard to degradation due to an absence of performing of a task.

According to one aspect, a method can be used for monitoring a task for an electronic module. The method comprises a wait for a performing of the task, a timing of the wait regulated by a clock signal, and a generation of at least one alert signal if the timing of the wait has exceeded a reference value.

The clock signal and the reference value are advantageously configured jointly in such a way as to protect the usage of the electronic module, and in conjunction with the task.

According to one mode of implementation, the timing of the wait comprises a counting with automatic reloading comprising an incrementation or a decrementation regulated by the clock signal, and an automatic reinitialization of the value of the counting to a starting value when the value of the counting reaches an end value, and a generation of an end signal at each automatic reinitialization, the at least one generation comprising the generation of the end signal forming the alert signal.

For example, the counting with automatic reloading comprises a reinitialization of the value of the counting to the starting value, without generating the end signal, on command of a forced reload signal, and in which a signal representative of the performing of the task is used as forced reload signal.

This mode of implementation exhibits the advantage of being simple and reliable, in particular since customary signals for multimedia interface control are used, without implementing an analysis that might be complex and prone to malfunctions.

Advantageously, the method furthermore comprises a comparison of the value of the counting with at least one other reference value, the at least one generation comprising a generation of a preliminary alert signal when the value of the count equals the at least one other reference value.

This affords the possibility of having additional alert signals at lower cost.

The monitoring method may be dedicated to a multimedia interface electronic module such as a display, and the task is a graphical task, such as an image refresh.

According to one mode of implementation, the clock signal corresponds to a counting of a given quantity of image frames processed by the multimedia interface module.

Such a clock signal may advantageously be a trigger signal formulated using a method described in the French Patent Application No. 1860188, titled "Procédé d'élaboration de signaux déclencheurs pour une commande d'une interface multimédia, et circuit intégré correspondant" [Method for formulating trigger signals for control of a multimedia interface, and corresponding integrated circuit], filed in the name of the applicant on the same day as the priority application of the present patent application. This French patent application is hereby incorporated herein by reference, as is the U.S. counterpart application entitled Method of Producing Triggering Signals for Control of a Multimedia Interface, which is being filed concurrently herewith.

That said, the clock signal may also originate from some other source, such as a control unit of the multimedia interface module. Generally, the clock signal and the reference duration are configured jointly in such a way as to protect the usage of the multimedia interface module in conjunction with the graphical task; this mode of implementation is an advantageous example for the joint configuration, using a signal directly representative of the usage of the multimedia interface module in conjunction with the graphical task.

According to one mode of implementation, the performing of the graphical task comprises a communication to the multimedia interface module of an image refresh signal.

According to one mode of implementation, the multimedia interface module is an organic light-emitting diode-based display module.

Advantageously, the reference value corresponds to a duration beyond which there is a risk of damage, at least in part, to the organic light-emitting diode-based display module displaying a static signal.

The method according to these modes of implementation makes it possible to solve in particular the above-mentioned drawback of degradation of OLED displays when they display a static signal for too long.

According to another aspect, there is proposed a device for monitoring a task for an electronic module, comprising a timer configured to wait for a performing of the task and time the wait in a manner regulated by a clock signal, and configured to generate at least one alert signal if the timing of the wait has exceeded at least one reference value.

According to one embodiment, the timer comprises a counter with automatic reloading configured to increment or decrement a value of the counter in a manner regulated by the clock signal, and, when the value of the counter reaches an end value, automatically reinitialize the value of the counter to a starting value and generate an end signal, the end signal forming the safety signal.

For example, the counter is furthermore configured to reload the value of the counter to the starting value, without generating the end signal, on command of a forced reload signal, and in which a signal representative of the performing of the task is used as forced reload signal.

Advantageously, the device furthermore comprises a comparator configured to compare the value of the counter with at least one other reference value, and to generate respectively at least one preliminary alert signal when the value of the counter equals the at least one other reference value.

The device may be dedicated to a multimedia interface electronic module such as a display, and the task is a graphical task, such as an image refresh According to one embodiment, the device comprises a device for generating trigger signals, configured to generate the clock signal corresponding to a counting of a given quantity of image frames displayed by the multimedia interface.

According to one embodiment, the timer is configured to wait for a performing of the graphical task comprising a communication of an image refresh signal to the multimedia interface module, by an external control module of the multimedia interface.

According to one embodiment, the device is dedicated to a multimedia interface module of the organic light-emitting diode-based display module type.

Advantageously, the at least one reference value corresponds to a duration beyond which there is a risk of damage, at least in part, to the organic light-emitting diode-based display module displaying a static signal.

There is also proposed an integrated circuit comprising a device such as defined hereinabove, as well as an electronic apparatus, such as a mobile telephone or a smartwatch, comprising the integrated circuit or a device such as defined hereinabove.

BRIEF DESCRIPTION OF THE DRAWINGS

Other advantages and characteristics of the invention will become apparent on examining the detailed description of wholly non-limiting embodiments and modes of implementation, and the appended drawings in which.

DETAILED DESCRIPTION OF ILLUSTRATIVE EMBODIMENTS

Figure 1:
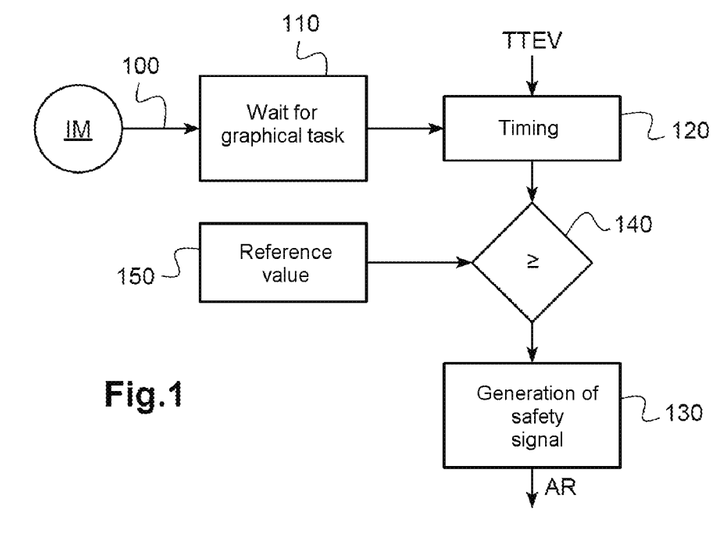
FIGS. 1 and 2 schematically illustrate various modes of implementation of the invention.

FIG. 1 illustrates a method for monitoring a task 100 for an electronic module IM, comprising a wait for a performing of the task 110, a timing of the wait 120 regulated by a clock signal TTEV, and at least one generation 130 of an alert signal AR if the timing of the wait has exceeded 140 a reference value 150.

FIG. 1 refers to a particular case of multimedia interface electronic module, such as a display and preferably of the organic light-emitting diode "OLED" display type, the monitored task being a graphical task.

The method is earmarked to be implemented by an integrated circuit device.

The method comprises a wait 110 for a performing of the graphical task 100 and a timing of the wait 120, regulated by a clock signal TTEV.

The performing of the graphical task 100 can comprise a communication to the multimedia interface module IM of an image refresh signal.

The image refresh signal, for example transmitted to the multimedia interface module IM from an external control element, may for example be a specific signal arising from a software instruction, or be generated automatically each time the control element gives an image refresh instruction. An image refresh instruction, within the framework of a module of the display type, typically comprises new graphical data to be displayed.

The current value of the timing 120 is compared 140 with at least one reference value 150. If the current value of the timing 120 is greater than or equal to the reference value, at least one respective alert signal AR is generated 130.

Stated otherwise, an alert signal AR is generated 130 if the timing of the wait has exceeded 140 a reference value 150.

For example, the clock signal TTEV corresponds to a counting of a given quantity of image frames processed by the multimedia interface module IM.

For a display multimedia interface module IM, by "quantity of image frames processed" is meant the quantity of frames displayed at the display's refresh frequency, defined by the number of images that can be displayed per second, otherwise referred to as vertical scan frequency.

The distinction must be made between the frequency of refreshing of the display (vertical scan), which is an intrinsic characteristic of the multimedia interface module, and the image refresh signal, which is a control signal typically accompanied by graphical data originating for example from an external control element.

Stated otherwise, by image refresh signal is meant a signal introducing variations into the displayed signal, while the quantity of image frames processed at the refresh frequency may comprise successive identical frames, that is to say the display of a static signal.

Thus, the clock signal TTEV, corresponding to a counting of a given quantity of image frames processed by the multimedia interface module IM, may be representative of a display of a static signal.

In the example of a module of the OLED display type, this mode of implementation makes it possible to protect the display from premature wear.

In this regard, the reference value 150 is determined so as to correspond to a duration beyond which there is a risk of damage to the OLED display module displaying a static signal.

Of course, the reference value, counted on the clock signal TTEV, is established by taking account of the hardware limits of the OLED display module used.

Thus, the reference value and the clock signal are both programmable, in order to configure them jointly so as to protect the usage of a given multimedia interface module in conjunction with a given graphical task.

For its programming, the reference value may for example be a variable recorded in a register.

For its programming, the clock signal TTEV may be an external shared clock signal, or preferably be a dedicated signal generated by a microcontroller, or more preferably be a synchronization signal possibly transmitted by the multimedia interface module, or still more preferably be a trigger signal formulated by a method or an integrated circuit such as taught in the French patent application 1860188 entitled "Procédé d'élaboration de signaux déclencheurs pour une commande d'une interface multimédia, et circuit intégré correspondant" [Method for formulating trigger signals for control of a multimedia interface, and corresponding integrated circuit], filed by the applicant on the same day as the priority application of the present patent application.

Indeed, the above-mentioned method for formulating trigger signals for control of a multimedia interface and the corresponding integrated circuit make it possible to generate flexible and adaptable trigger signals TTEV, and thus to generate a clock signal perfectly configured to protect the usage of a given multimedia interface module in conjunction with a given graphical task.

Moreover, the method is advantageously implemented distinctly from the multimedia interface control operations (generally done by a microcontroller). Thus, the method makes it possible to protect the display in case of malfunctioning of the control operations, even in the eventuality that the latter were to comprise a comparable preventive measure.

Figure 2:
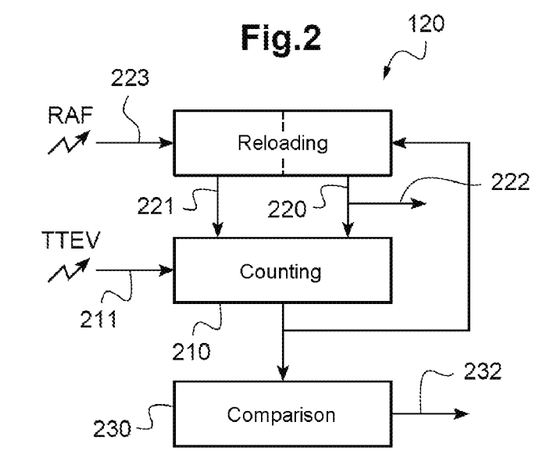

FIG. 2 represents an exemplary mode of implementation of timing 120 of a method such as described in conjunction with FIG. 1.

In this example, the method comprises, in order to time the wait 120, a counting with automatic reloading 210 regulated by a signal 211 of the clock signal type. The clock signal TTEV is used directly to regulate 211 the counter 210.

It is immaterial whether the counting 210 be an ascending counting, comprising an incrementation at each rising edge of the clock signal TTEV, or a descending counting, comprising a decrementation at each rising edge of the clock signal TTEV.

The value of the counting is automatically reinitialized 220 to a starting value (usually zero for an ascending counting and a programmable value for a descending counting) when the value of the counting reaches an end value (usually a programmable value for an ascending counting and zero for a descending counting).

When the value of the counting reaches the end value, an end signal 222 is generated.

Thus, the programmable starting value (for a descending counting) or end value (for an ascending counting) is established in such a way that the end of the counting is representative of a reference duration (reference value), as a function of the clock signal TTEV.

The reference value corresponds to a duration beyond which the absence of graphical task is problematic.

Thus, the end signal 222 may form the alert signal AR directly.

Furthermore, the counting 210 with automatic reloading comprises a reinitialization 221 of the value of the count to the starting value, without generating the end signal 222, on command of a forced reload signal 223.

Here, the signal RAF representative of the performing of the graphical task is used directly as forced reload signal 223.

Thus, after the graphical task is performed, the value of the counting is reinitialized and the elapsing of the complete reference duration is awaited before the alert signal AR is generated.

The method may comprise a comparison 230 of the value of the counting with at least one other reference value, possibly likewise programmable and stored in a register.

If the value of the counting 210 equals the at least one other reference value 150, then a respective preliminary alert signal 232 is generated.

The alert signals 222, 232, preliminary or not, may allow a command of the multimedia interface to engage protection measures.

For example, in the case mentioned hereinabove of a forestalling of static display on an OLED display, the command may make provision for a standby mode which displays a moving image, or for turning off the screen. Forced shutdown of the screen may also be provided for as a last resort, this being advantageous for example in a case of malfunction of the command.

Figure 3:
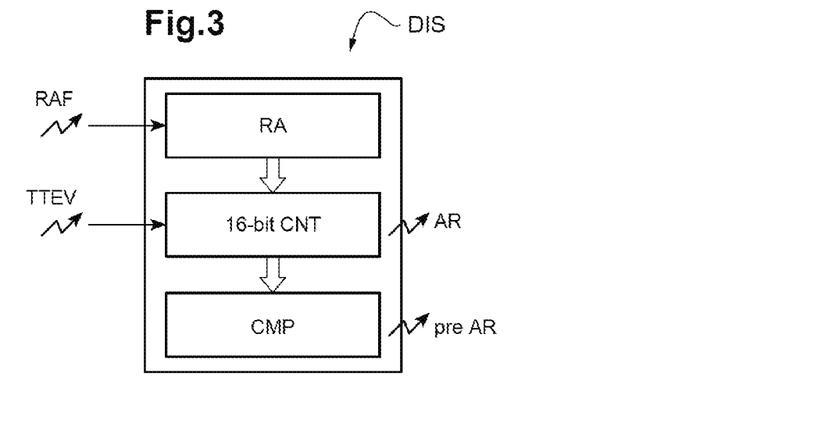
FIGS. 3 to 5 schematically illustrate various embodiments of the invention.

FIG. 3 illustrates a particular example of a device DIS for monitoring a task of an electronic module.

The monitoring device DIS is configured to wait for a performing of the task, time the wait in a manner regulated by at least one clock signal TTEV, and generate at least one safety signal AR if the timing of the wait has exceeded at least one reference value.

Likewise, FIG. 3 refers to a particular example in which the electronic module is a multimedia interface, such as a display and preferably an organic light-emitting diode OLED display, the monitored task being a graphical task.

The monitoring device DIS comprises a counter CNT, for example on 16 bits with automatic reloading RA. The value of the counter CNT is incremented or decremented in a manner regulated by a clock signal TTEV.

Hereinafter, the example of a down counter will be considered, the value of which is decremented by the clock signal TTEV. This example is not limiting.

The starting value of the counter is loaded automatically from an automatic reload register RA. When the value of the counter is decremented down to an end value, usually zero, the starting value is reinitialized automatically, and an end-of-decrementation signal AR is generated. Here, the end-of-decrementation signal is used directly as safety signal AR.

Nonetheless, a forced reload signal may make it possible to command a reinitialization of the value of the counter CNT to its starting value before reaching zero, without generating the end-of-decrementation signal AR. The signal RAF representative of the performing of the graphical task is used directly as forced reload signal.

The monitoring device DIS may comprise a comparator CMP configured to compare the current value of the counter CNT with at least one reference value recorded in a register. When the value of the counter reaches the at least one reference value, at least one respective preliminary alert signal preAR is generated so as to signal the approach of a dangerous situation.

The monitoring device DIS is most particularly adapted to a multimedia interface module of the OLED organic light-emitting diode-based display type.

Indeed, an absence of refreshing of the display for too long a duration may irreversibly damage the OLED display interface.

Thus, the event resulting from the graphical task may advantageously comprise a signal RAF representative of a refreshing of the image.

Figure 4:
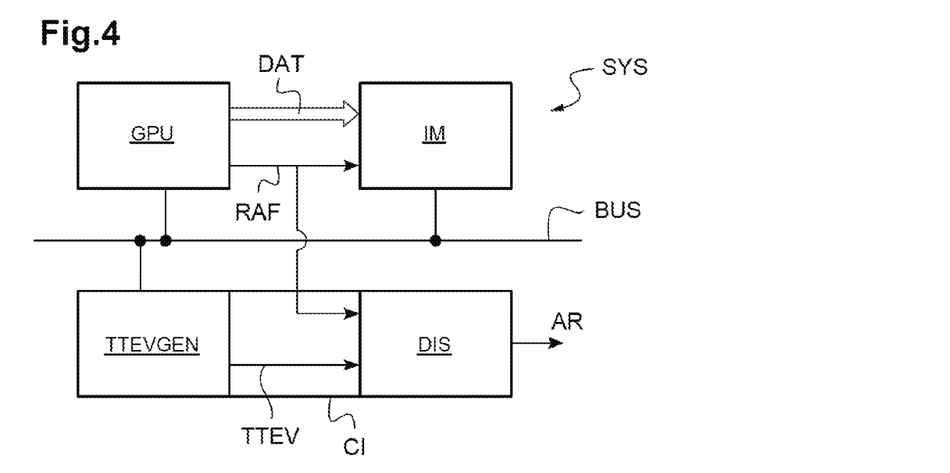

FIG. 4 illustrates an exemplary application of a device DIS such as described hereinabove in conjunction with FIG. 3, in a system comprising an integrated circuit CI comprising the device DIS, the multimedia interface module IM, and a control unit GPU of the multimedia interface IM. The various elements are in particular linked by a data bus BUS.

In this example, the multimedia interface module IM is an OLED organic light-emitting diode-based display module, and the device DIS is dedicated to a multimedia interface module IM of the OLED organic light-emitting diode-based display module type.

In this example, the integrated circuit CI comprising the device DIS furthermore comprises a device for generating trigger signals TTEVGEN, configured to generate the clock signal TTEV.

The clock signal TTEV corresponds for example to a counting of a given quantity of image frames displayed by the multimedia interface IM, such as described in the French Patent Application No. 1860188, titled "Procédé d'élaboration de signaux déclencheurs pour une commande d'une interface multimédia, et circuit intégré correspondant" [Method for formulating trigger signals for control of a multimedia interface, and corresponding integrated circuit], filed by the applicant on the same day as the priority application of the present patent application.

Here also, by image refresh signal is meant a signal introducing variations into the displayed signal, while the quantity of image frames processed at the refresh frequency may comprise successive identical frames, that is to say the display of a static signal.

In the system SYS, the control unit GPU can communicate image data DAT to the multimedia interface module IM, as well as control signals, such as an image refresh signal RAF. The image refresh signal RAF communicated by the control unit GPU controls the display of new image data replacing old image data.

In this example, the device DIS is configured to wait, in the guise of the graphical task, for a communication of the image refresh signal RAF to the multimedia interface module IM, by a control module of the multimedia interface GPU.

The device DIS is configured to generate the alert signal AR if no image refresh RAF is communicated for a duration beyond which there is a risk of damage, at least in part, to the OLED organic light-emitting diode-based display module displaying a static signal.

Figure 5:
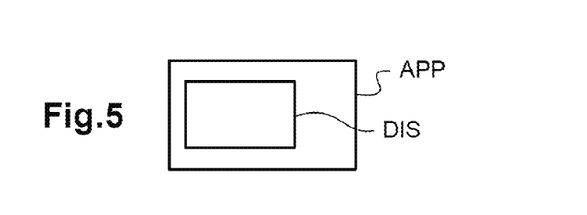

FIG. 5 illustrates schematically an electronic apparatus, such as a mobile telephone or a smartwatch, comprising a device DIS such as described previously in conjunction with FIG. 3 or 4, possibly incorporated into an integrated circuit CI.

Figure 6:
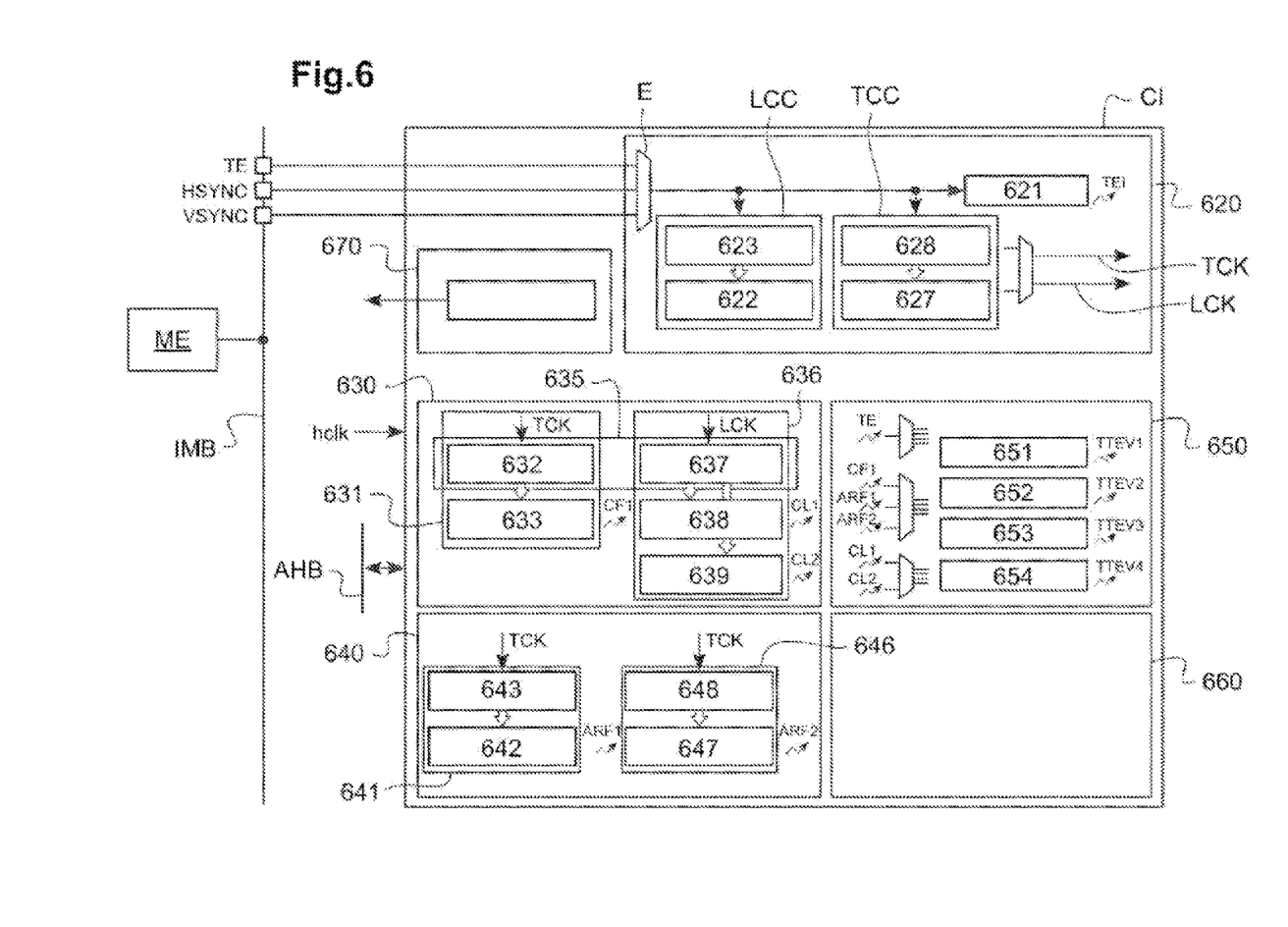
FIGS. 6 to 10 schematically illustrate embodiments of the invention.

FIG. 6 illustrates an example of an integrated circuit CI for creating trigger signals TTEVi ($1 \leq i \leq 4$) for controlling an electronic module ME. The integrated circuit CI may be incorporated for example into a microcontroller or into a system-on-chip.

The integrated circuit CI comprises a timing signal generation circuit 620, at least one counting circuit 630, 640 and a trigger signal generation circuit 650.

The timing signal generation circuit 620 is configured so as to generate digital timing signals TCK, LCK emulating synchronization signals HSYNC, VSYNC internal to the electronic module ME and not available outside the module ME.

A first counting circuit 630 is configured so as to count edges of the timing signals TCK, LCK in an absolute manner. A second counting circuit 640 is configured so as to count edges of the timing signals TCK, LCK in a relative manner. The trigger signal generation circuit 650 is configured so as to generate the trigger signals TTEVi ($1 \leq i \leq 4$) on the basis of respective events $65i$ ($1 \leq i \leq 4$) conditional on the current values of the counting circuits 630, 640.

In this example, the integrated circuit CI comprises an input E receiving at least one synchronization signal VSYNC, HSYNC, TE internal to the electronic module and coming from the electronic module ME and made available outside the module via a bus IMB. The timing signal generation circuit 620 may be configured so as to generate the digital timing signals TCK, LCK using the at least one synchronization signal VSYNC, HSYNC, TE. In this respect, reference will be made to the description given hereinafter with reference to FIG. 7.

For example, in the case of a multimedia interface module, the timing signal generation circuit 620 is configured so as to generate a start of line signal LCK emulating a horizontal synchronization signal HSYNC internal to the multimedia interface module and not available outside the module, and/or a start of frame signal TCK emulating a vertical synchronization signal VSYNC internal to the multimedia interface module and not available outside the module.

The start of line signal LCK and the start of frame signal TCK will be transmitted to the first absolute counting circuit 630 and to the second relative counting circuit 640 so as to time the counting elements. The current values of the counting circuits 630, 640 will be used by the trigger signal generation circuit 650 to test them for conditions $65i$ ($1 \leq i \leq 4$) representative of useful events.

In the example illustrated by FIG. 6, the first counting circuit 630 includes an absolute frame counter 631 and an absolute line counter 636.

The absolute frame counter 631 includes an ascending counter element 632 on 20 bits with free operation. The current value of the counter element 632 is incremented at each rising edge of the start of frame signal TCK.

A comparison value is recorded in a comparison register 633, also on 20 bits. An event CF1 is generated when the current value is equal to the comparison value.

The absolute line counter 636 includes an ascending counter element 637 on 12 bits with free operation. The current value of the counter element 637 is incremented at each rising edge of the start of line signal LCK.

Two comparison values are recorded in respective comparison registers 638, 639, also on 12 bits. Events CL1, CL2 are generated when the current value is equal to one of the comparison values.

The absolute counters 631, 636 may be controlled by conventional activation and reset signals that may come from hardware or software control elements. In the event of over-indexation of the field of the counters 632, 637, the absolute counters 631, 636 generate a flag signal intended for the control elements.

Furthermore, a value of the total absolute time on 32 bits may be read directly from a register 635 containing the 20 bits of the absolute frame counter 631 as most significant bits and the 12 bits of the absolute line counter 636 as least significant bits.

The various absolute counts of the first counting circuit 630 thus supply conditional signals CF1, CL1, CL2 for generating precise events TTEVi.

In the example illustrated by FIG. 6, the second counting circuit 640 includes two relative frame counters 641, 646.

The second relative counting circuit 640 makes it possible to generate periodic events for synchronizing the graphical tasks with conditions established with respect to the frames.

The relative frame counters 641, 646 include descending counter elements on 12 bits 642, 647 with automatic reloading. The counts of the counter elements 642, 647 are decremented at each rising edge of the start of frame signal TCK.

The starting values of the respective counts are loaded automatically from a respective automatic reload register AR 643, 648. When the respective counts are decremented to zero, the starting value is reloaded automatically and a respective end of countdown signal ARF1, ARF2 is generated.

The absolute counters 631, 636 may be controlled by conventional activation, wait and reset signals that may come from hardware or software control elements.

Moreover, the values of the instantaneous relative counts may be read from each frame counter 641, 646, directly from the register of the respective counter 642, 647.

The various signals resulting from the absolute counts CF1, CL1, CL2 and relative counts ARF1, ARF2 are used by the trigger signal generation circuit 650 to generate the trigger signals TTEVi ($1 \leq i \leq 4$) on the basis of respective events $65i$ ($1 \leq i \leq 4$) conditional on the signals CF1, CL1, CL2 ARF1, ARF2.

The trigger signal generation circuit 650 may be configured so as to generate at least one complex trigger signal TTEVi on the basis of an event conditional on a combination of conditions regarding the current values of the counting circuits.

The event generator may combine events regarding the various conditions CF1, CL1, CL2, ARF1, ARF2. For example, up to 4 events may be combined using conventional logic functions (AND, OR, NOT, etc.).

Moreover, the integrated circuit CI may include an input-output interface to a bus AHB of advanced microcontroller bus architecture type, in particular in order to communicate with a microcontroller or a graphics computing unit. For example, the trigger signals TTEVi may be communicated via the bus AHB. The integrated circuit may also typically include control and status registers 670, and a clock input hclk supplying the hardware frequency.

The synchronization signal generation circuit is advantageously able to be controlled in a configuration tailored to the reproduction of given synchronization signals (HSYNC, VSYNC), internal to a given electronic module, for example via a configuration coming from a microcontroller and transmitted on the bus AHB.

The bus AHB may preferably be of advanced peripheral bus architecture type, usually denoted using the acronym "APB" for the term "advanced peripheral bus".

This integrated circuit is particularly suitable for controlling a multimedia interface electronic module, such as a display interface or a camera interface.

Furthermore, the integrated circuit CI may comprise a device 660 for monitoring a graphical task of the multimedia interface module, advantageously an OLED display interface. In this respect, reference will be made to the description given hereinafter with reference to FIG. 8.

Figure 7:
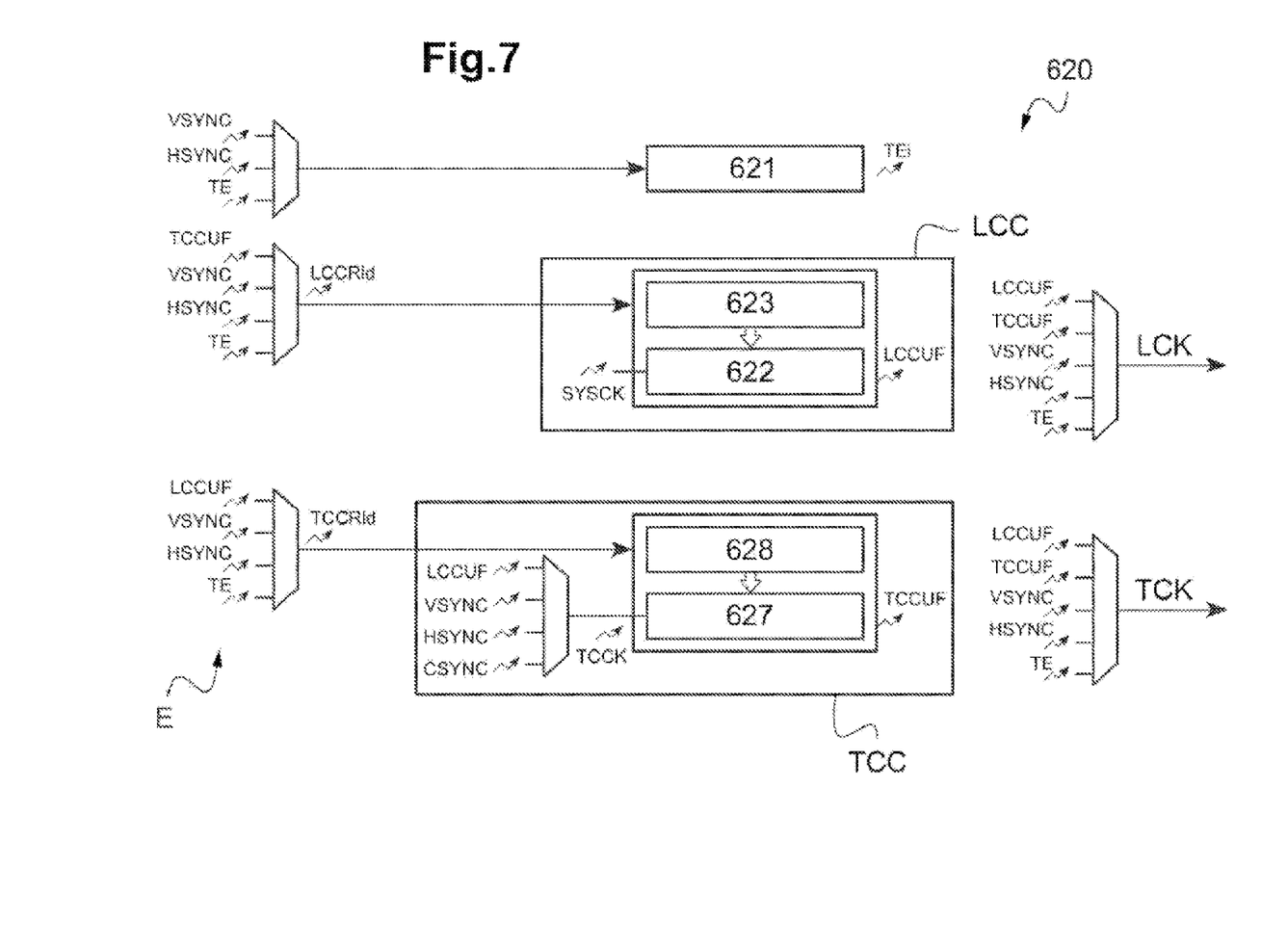

Reference is now made to FIG. 7 for discussing the generation of the digital timing signals TCK, LCK by way of the timing signal generation circuit 620.

The internal timing signal generation circuit 620 comprises a line counter LCC, a frame counter TCC and a tearing effect signal TE detector 621.

The tearing effect signal detector 621 is configured so as to detect a tearing effect signal TE, for example by detecting a rising edge or a falling edge on the signal TE, depending on the polarity that is used, and to generate an internal digital signal TEi representative of this detection.

The line counter LCC includes a descending counter element 622 on 22 bits 622 with automatic reloading register 623. The current value of the counter element 622 is decremented at each rising edge of an internal clock signal SYSCK. The internal clock signal SYSCK is for example the clock signal hclk mentioned above with reference to FIG. 6.

The starting value of the counter is loaded automatically from an automatic reload register 623. When the current value is decremented to zero, the starting value is reloaded automatically and an end of decrement signal LCCUF is generated.

However, a forced reload signal LCCRld may make it possible to reload the counting element 622 to its starting value before it has reached zero, without generating the end of decrement signal LCCUF.

The starting value of the line counter LCC is chosen such that, at the frequency of the internal clock signal SYSCK, the countdown reaches zero (and generates a flag LCCUF) at the time of each start of line of the module.

The frame counter TCC includes a descending counter element 627 on 12 bits with automatic register reloading 628. The current value of the counter element 627 is decremented at each rising edge of a clock signal of the frame counter TCCK.

The starting value of the counter is loaded automatically from an automatic reload register 628. When the current value is decremented to zero, the starting value is reloaded automatically and an end of decrement signal TCCUF is generated.

However, a forced reload signal TCCRld may make it possible to reload the counting element 627 to its starting value before it has reached zero, without generating the end of decrement signal TCCUF.

The starting value of the frame counter TCC is chosen such that, timed by a signal representative of a start of line LCCK, the countdown reaches zero, and generates a flag TCCUF, at the time of each start of frame of the module.

It is recalled that, in the example of FIG. 6, the circuit CI comprises an input E intended to receive at least one synchronization signal VSYNC, HSYNC, TE internal to the electronic module and coming from the electronic module. Plus, the timing signal generation circuit 620 is configured so as to generate the digital timing signals TCK, LCK using the at least one synchronization signal VSYNC, HSYNC, TE.

In the context of an integrated circuit for creating trigger signals CI and designed to control a multimedia interface electronic module, such as a display interface or a camera interface, it is considered that the synchronization signals internal to the module and not available outside the module may be a vertical synchronization signal VSYNC or a horizontal synchronization signal HSYNC. An external synchronization signal TE of "tearing effect" type may possibly be available outside the module.

These synchronization signals will be denoted hereinafter directly using their references "VSYNC", "HSYNC".

That being the, the timing signal TCK, LCK generation circuit 620 may operate in various modes:
  in autonomous mode, with no synchronization signal available outside the module;
  with HSYNC and VSYNC available outside the module;

with only HSYNC available outside the module;
with only VSYNC available outside the module;
with only CSYNC available outside the module (CSYNC=HSYNC+VSYNC).

All of the examples described below are given by way of reference, but other combinations may of course be contemplated.

In autonomous mode, the circuit 620 generates the digital timing signals TCK, LCK without any external signal.

The counter 622 is timed by the internal clock signal SYSCK and generates a flag LCCUF at the time of each start of line of the module. The flag LCCUF thus forms the start of line signal LCK emulating the signal HSYNC that is not available outside the module.

The flag LCCUF is used as clock signal TCCK for timing the counter element 627 of the frame counter TCC.

The counter 627 thus generates a flag TCCUF at the time of each start of frame of the module. The flag TCCUF thus forms the start of frame signal TCK emulating the signal VSYNC that is not available outside the module.

In the mode with HSYNC and VSYNC, the circuit 620 directly copies HSYNC as start of line signal LCK and VSYNC as start of frame signal TCK.

In the mode with only HSYNC, the circuit 620 generates the timing signals TCK, LCK using only the signal HSYNC.

The signal HSYNC is directly copied as start of line signal LCK.

The signal HSYNC is used as clock signal TCCK for timing the counter element 627 of the frame counter LCC. The flag TCCUF thus forms the start of frame signal TCK emulating the signal VSYNC that is not available outside the module.

In the mode with only VSYNC, the circuit 620 generates the timing signals TCK, LCK using only the signal VSYNC.

The signal VSYNC is directly copied as start of frame signal TCK.

The counter element 622 is timed by the internal clock signal SYSCK. The flag LCCUF thus forms the start of line signal LCK emulating the signal HSYNC that is not available outside the module.

The signal VSYNC is also used as forced reload signal LCCRld for the line counter LCC. The start of line signal LCK is thus resynchronized with each start of frame VSYNC.

In the mode with CSYNC only, the circuit 620 generates the timing signals TCK, LCK using only the signal CSYNC, the signal CSYNC being a signal comprising the sum of the two signals HSYNC and VSYNC. It is considered that the signal CSYNC is transmitted on the terminal "TE".

The counter 322 is timed by an internal clock signal SYSCK and generates a flag LCCUF when it reaches the end of its countdown (zero).

The signal CSYNC is used as forced reload signal LCCRld for the line counter LCC. The line counter is thus reloaded at each pulse of the component HSYNC of the signal CSYNC, and does not generate a flag LCCUF at these times.

However, the line counter LCC is not reloaded by the pulses of the component VSYNC of the signal CSYNC, as the component VSYNC does not vary over a duration longer than the counting of a line. During the pulse of the component VSYNC of the signal CSYNC, the line counter LCC then generates an end of decrementation flag signal LCCUF emulating a pulse of the signal HSYNC that is not available outside the module, and the signal CSYNC is directly copied as start of line signal LCK.

The flag LCCUF also forms the start of frame signal TCK emulating the signal VSYNC that is not available outside the module.

Figure 8:
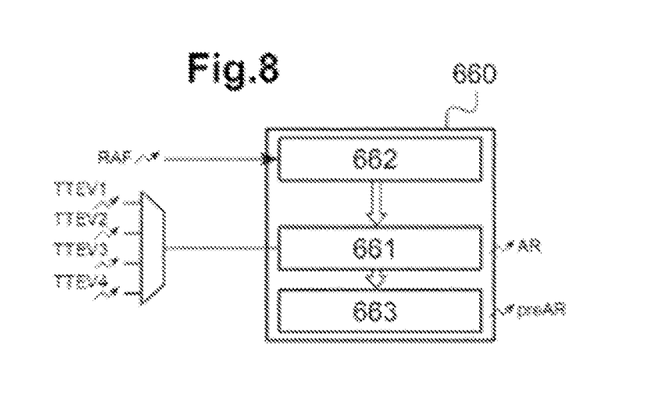

FIG. 8 illustrates an example of a device 660 for monitoring a graphical task RAF of a multimedia interface module ME.

The monitoring device 660 is configured so as to wait for the graphical task RAF to be performed, time the wait in a manner timed by at least one of the trigger signals TTEVi, and generate at least one security signal AR if the timing of the wait has exceeded a respective reference value.

In this respect, the monitoring device 660 includes a descending counter element on 16 bits 661 with automatic reloading 662. The current value of the counter element 661 is decremented in a manner timed by a dedicated trigger signal TTEVi.

The starting value of the counter is loaded automatically from an automatic reload register 662. When the current value is decremented to zero, the starting value is reloaded automatically and an end of decrement signal acting as security signal AR is generated.

However, a forced reload signal may make it possible to reload the counting element 661 to its starting value before it has reached zero, without generating the end of decrement signal AR. The signal RAF representative of the performance of the graphical task is used as forced reload signal.

The monitoring device may additionally include a comparator 663 configured so as to compare the current value of the counter element 661 with at least one other reference value recorded in a register. When the countdown reaches the at least one other reference value, at least one respective preliminary warning signal preAR is generated, for example in order to signal the approach of a hazardous situation.

The monitoring device 660 is particularly suitable when the multimedia interface module is an "OLED" display module having organic light-emitting diodes. Specifically, a lack of refreshing of the display for an excessively long time may irreversibly damage the OLED interface.

Thus, the event resulting from the graphical task may advantageously comprise a signal RAF representative of refreshing of the image.

Figure 9:
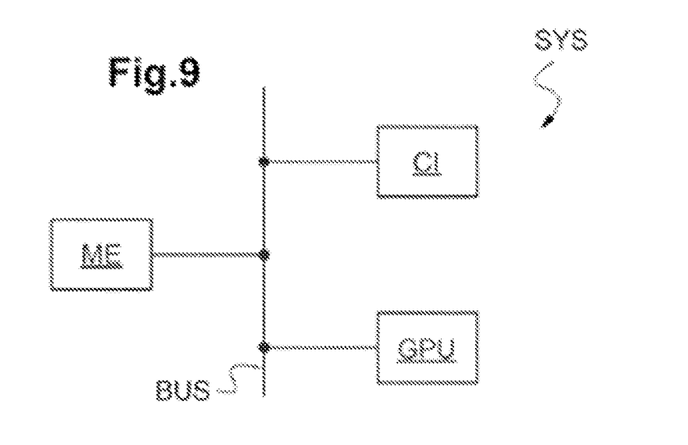

FIG. 9 shows a system for controlling an electronic module ME, comprising an electronic module ME such as a multimedia interface module IM, an integrated circuit CI for creating trigger signals of the type of integrated circuit described above with reference to FIGS. 6 to 8, and a computing unit GPU.

The multimedia interface module ME may be configured so as to supply at least one synchronization signal to the input of the integrated circuit CI for creating trigger signals, via a data bus BUS. In this depiction, the bus BUS may comprise the bus IMB and the bus AHB that were described above with reference to FIG. 7.

The computing unit GPU is configured so as to independently and autonomously perform control operations at times respectively controlled by the trigger signals.

Reference is again made to FIG. 5, in this case in relation to the system SYS, in which the electronic module ME is a display interface module DSPL.

The computing unit GPU is configured so as to perform at least one of the following control operations:
  operations OP1, OP11 of refreshing the display interface DSPL at times controlled by respective first trigger signals TTEV1, TTEV11;
  a graphical computing operation OP2 at a time controlled by a second trigger signal TTEV2;

an operation OP3 of reading touch coordinates from a touch controller TACT belonging to the system at a time controlled by a third trigger signal TTEV3.

Reference is now made to FIG. 6, in this case in relation to the system SYS, in which the electronic module ME is a camera interface module CAMIF.

The computing unit GPU is configured so as to perform at least one of the following graphical operations:

an operation OP4 of transmitting an outgoing stream of image data at a time controlled by a first trigger signal TTEV4;

an operation OP5 of digitally processing a stream of image data, such as compressing the data, at a time controlled by a second trigger signal TTEV5.

Figure 10:
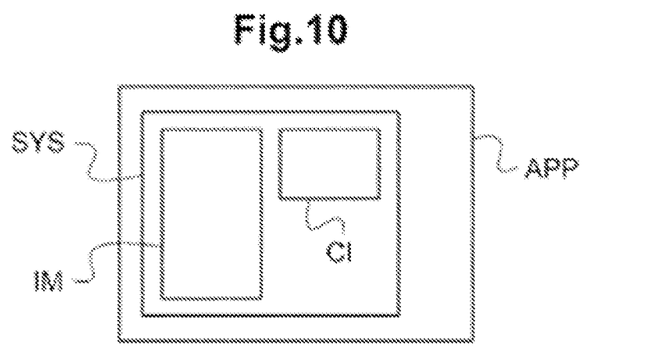

FIG. 10 shows an electronic apparatus APP, such as a smartwatch, a smartphone or a video camera. The electronic apparatus APP includes a system SYS such as described above with reference to FIG. 9. The system SYS thus includes in particular an integrated circuit CI for generating trigger signals, for example incorporated into a system-on-chip equipped in particular with a computing unit, for example in the form of a microcontroller, as well as a multimedia interface IM, such as a display or a camera sensor.

Moreover, the invention is not limited to these embodiments, but incorporates all variants thereof; for example, it is reiterated, even though the example of a multimedia interface module has been emphasized, that the embodiments and modes of implementation apply to the control of any type of electronic module that may have several synchronization points.

The invention also incorporates a method comprising generating, outside an electronic module ME, at least one digital timing signal LCK, TCK emulating at least one first synchronization signal HSYNC, VSYNC internal to the module and not available outside the module as such. A corresponding integrated circuit is described above with reference to FIG. 7 according to one particular embodiment.

The generation of the at least one timing signal LCK, TCK may comprise dividing the frequency of an elementary digital clock signal SYSCK, TCCK. Of course, the generation of the timing signals TCK, LCK may be able to be parameterized on the basis of inherent characteristics of the module ME. In the presence of a second synchronization signal HSYNC, VSYNC, TE coming from the module and available outside the module, the generation of the at least one timing signal LCK, TCK emulating the at least one first signal may advantageously use the second signal. For example, the second signal HSYNC is used as elementary digital clock signal TCCK, or else the second signal VSYNC is used to reset a phase of the timing signal resulting from the frequency-divided elementary digital clock signal SYSCK.

Moreover the invention is not limited to these embodiments and modes of implementation but embraces all variants thereof; it is recalled in particular that the monitoring of a task can apply to an electronic module of a type other than an OLED display, the monitored task being able likewise to be of a different nature.

What is claimed is:

1. A method of monitoring a task for an electronic module, the method comprising:
receiving a programmable clock signal, the programmable clock signal comprising one of a plurality of trigger signals generated by a trigger signal generator;
timing a wait for a performance of the task by counting clock cycles of the programmable clock signal; and
generating an alert signal when the timing of the wait has exceeded a reference value.

2. The method according to claim 1, wherein timing the wait comprises:
incrementing or decrementing a value for each clock cycle of the programmable clock signal wherein the value is initialized with a starting value;
automatically reinitializing the value to the starting value when the value reaches an end value; and
generating an end signal when the value reaches the end value, the end signal comprising the alert signal.

3. The method according to claim 2, wherein the timing of the wait comprises reinitializing the value to the starting value on command of a forced reload signal, and wherein the forced reload signal comprises a signal representative of performing the task.

4. The method according to claim 2, further comprising comparing the value with a second reference value; and generating a preliminary alert signal when the value equals the second reference value.

5. A method of monitoring a graphical task for a multimedia interface module, the method comprising:
receiving a programmable clock signal, the programmable clock signal comprising one of a plurality of trigger signals generated by a trigger signal generator;
waiting for a performance of the graphical task;
timing the wait by counting clock cycles of the programmable clock signal; and
generating an alert signal when the timing of the wait has exceeded a reference value.

6. The method according to claim 5, wherein the multimedia interface module comprises a display and wherein the graphical task comprises an image refresh.

7. The method according to claim 5, wherein the programmable clock signal corresponds to a counting of a given quantity of image frames processed by the multimedia interface module.

8. The method according to claim 5, wherein the performance of the graphical task comprises communicating an image refresh signal to the multimedia interface module.

9. The method according to claim 5, wherein the multimedia interface module is an organic light-emitting diode based display module.

10. The method according to claim 9, wherein the reference value corresponds to a duration beyond which there is a risk of damage to the organic light-emitting diode based display module displaying a static signal.

11. A device for monitoring a task for an electronic module, the device comprising:
a timer regulated by a programmable clock signal, the programmable clock signal comprising one of a plurality of trigger signals generated by a trigger signal generator, the timer being configured to wait for performance of the task and to time a length of the wait, and
a signal generator configured to generate an alert signal when the length of the wait has exceeded at least one reference value.

12. The device according to claim 11, wherein the timer comprises a counter to time the length of the wait, the counter being configured to increment or decrement a value of the counter for each clock cycle of the programmable clock signal, and, when the value of the counter reaches an end value, to automatically reinitialize the value of the counter to a starting value and to generate an end signal, the end signal comprising the alert signal.

13. The device according to claim 12, wherein the counter is further configured to reload the value of the counter to the starting value on command of a forced reload signal, and wherein the forced reload signal comprises a signal representative of the performance of the task.

14. The device according to claim 12, further comprising a comparator configured to compare the value of the counter with a second reference value, and to generate a preliminary alert signal when the value of the counter equals the second reference value.

15. The device according to claim 11, wherein the device is incorporated into a multimedia interface electronic module and wherein the task comprises a graphical task.

16. The device according to claim 15, wherein the multimedia interface electronic module comprises a display and wherein the graphical task comprises an image refresh.

17. The device according to claim 15, further comprising the trigger signal generator, the trigger signal generator being configured to generate the programmable clock signal corresponding to a counting of a given quantity of image frames displayed by a multimedia interface of the multimedia interface electronic module.

18. The device according to claim 15, wherein the graphical task comprises communication of an image refresh signal to the multimedia interface electronic module, by an external control module of a multimedia interface of the multimedia interface electronic module.

19. The device according to claim 15, wherein the device is incorporated into a multimedia interface module of an organic light-emitting diode-based display module type.

20. The device according to claim 19, wherein the reference value corresponds to a duration beyond which there is a risk of damage to the organic light-emitting diode-based display module displaying a static signal.

* * * * *